March 4, 1958     H. F. HOBBS     2,825,245
VARIABLE RATIO POWER TRANSMISSION APPARATUS
Filed Aug. 24, 1953     4 Sheets-Sheet 1

Inventor
HOWARD F. HOBBS
By Young, Emery & Thompson
Attorneys

Inventor
HOWARD F. HOBBS

March 4, 1958   H. F. HOBBS   2,825,245
VARIABLE RATIO POWER TRANSMISSION APPARATUS
Filed Aug. 24, 1953   4 Sheets-Sheet 4

Inventor
HOWARD F. HOBBS
By Young, Emery &
Thompson
Attorneys

United States Patent Office 2,825,245
Patented Mar. 4, 1958

2,825,245

VARIABLE RATIO POWER TRANSMISSION APPARATUS

Howard Frederick Hobbs, Leamington Spa, England, assignor to Hobbs Transmission Limited, Leamington Spa, England Application August 24, 1953, Serial No. 376,155

Claims priority, application Great Britain September 9, 1952

5 Claims. (Cl. 74—763)

This invention relates to variable ratio power transmission apparatus of the kind having gearing associated with a number of friction devices, whereby different ratios can be brought into operation by selective engagement of the friction devices.

Apparatus of this kind is well known and usually takes the form of a series of epicyclic gear trains having friction devices acting as brakes which can hold one or another element of the gear train stationary thereby producing the required transmission ratio between the input and output element, and one or more clutches which can be used to either transmit power from an input part or to lock various parts of the gear trains together.

The advantage obtained from apparatus of this kind is that change in ratio can be effected in an easy and certain manner and with less skill on the part of the operator. In some cases, technical advantage may be obtained in that the apparatus can be changed from one ratio to another without interruption in the transmission of power. Apparatus of this kind lends itself to the use of control devices providing so-called automatic change, i. e. change in ratio according to road or engine speeds, which may be influenced by torque and/or engine throttle opening.

Apparatus hitherto proposed has involved complication, weight and bulk, as compared with the more commonly used transmission gearing, and has been such that considerable limitation has been introduced concerning the actual power transmission ratios obtainable. The main disadvantage, however, has been the need to engage more than one friction element to make the changes in ratio. This has introduced the need for "timing" the engagement of the elements if uninterrupted change is required, for example, a clutch and brake may have to be engaged and another clutch and brake disengaged to provide the change in ratio. It may be necessary that one be engaged slightly in advance of the other if a smooth change is to result, and also that the disengagement must take place at the appropriate time relationship. This has resulted in considerable complication in applying automatic control, and made it almost impossible to produce a smooth continuous change in ratio under all conditions of operation. Furthermore, an arrangement of this sort usually involves a considerable change in the speed of certain parts of the epicyclic or planetary gearing, for example, a comparatively heavy cage carrying a number of pinions must be held stationary during operation in one ratio, but may be rotated at engine speed during rotation of the next ratio. This adds to the difficulty of providing a smooth change, and also increases the necessity for complicated timing arrangements, since if there is a considerable change in momentum and the energy is required to be imparted to the gear train from the output shaft, a reversal of torque will take place. Another disadvantage is that during acceleration for example from rest, it may be necessary to impart substantial energy to the gear train, thus reducing the acceleration available. The object of the present invention is to provide a simple and robust transmission which will provide at least 4 forward ratios when required, and which can be changed under power and without loss of traction, by the disengagement and engagement of only one friction element. A further object is to provide a gear train from which suitable ratios can be obtained, and which enables the change in ratio to be accomplished with the minimum change in momentum, for example: the relatively heavy cage and pinions of the gear train may be stationary in first gear, rotating slowly in second gear, at a greater speed in third gear, and rotating at engine speed in fourth gear. A still further object is to provide an arrangement whereby relatively simple timing means may be employed to vary the disengagement and engagement according to whether up or down changes are being made and according to the speeds at which the changes are to be accomplished. It will be understood that in a transmission of this kind, when making an up change under full power, it is desirable that the traction is fully maintained throughout the change, and one friction element must not completely disengage until the other friction element becomes engaged. When making a down change under full power it is desirable that the one element disengage before the other element engage, so as to give the engine time for the appropriate increase in speed. It is clearly much easier to achieve this if only one element is to be disengaged and only one element is to be engaged to produce the change in ratio.

According to the invention, a power transmission mechanism comprises at least two sun wheels at least one of which sun wheels is driven by an input driving member, a planetary cage element, a first spindle element carried by said cage, the axis of said first spindle element being offset from the axis of said sun wheels, a set of gear teeth on said first spindle element in mesh with one of said sun wheels, a second set of teeth on said first spindle element, a second spindle element carried by said cage, gearing carried by the second spindle element and meshing with the second set of teeth on the first spindle element and with the other sun wheel, an output shaft, means connecting the output shaft with one of said elements, and means connecting at least one of said sun wheels to said reaction brake.

In order that the invention may be readily carried into effect, constructional forms thereof will now be described by way of example with reference to the accompanying drawings, wherein.

Figure 1A:
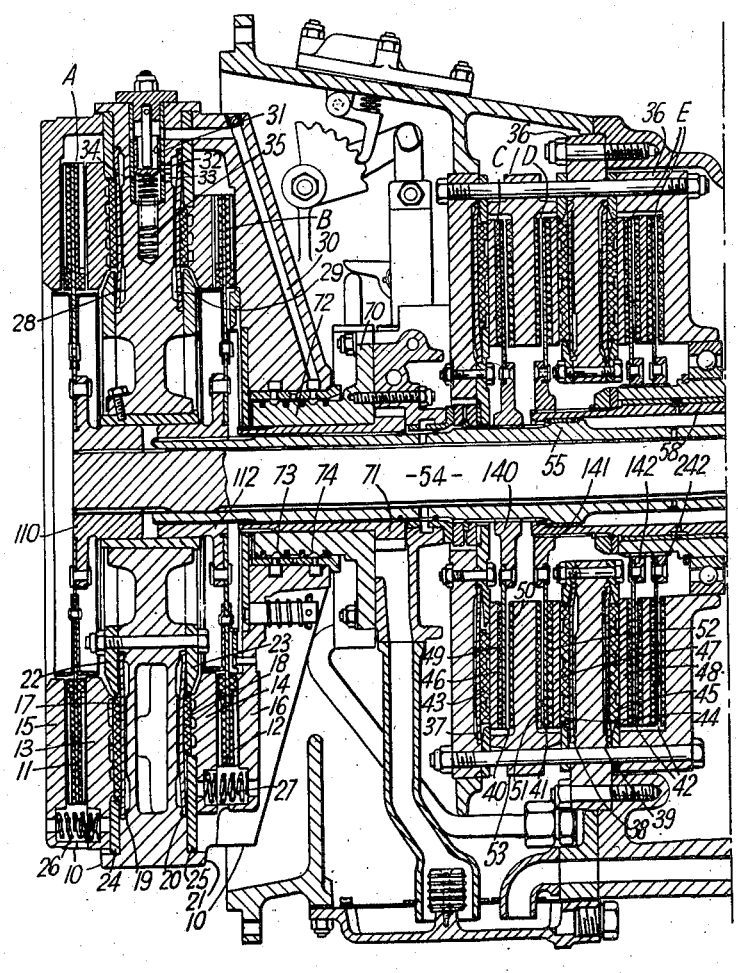
Figure 1 (1a and 1b) is a sectional view of a variable speed power transmission, made in accordance with the present invention.
Figure 1B:
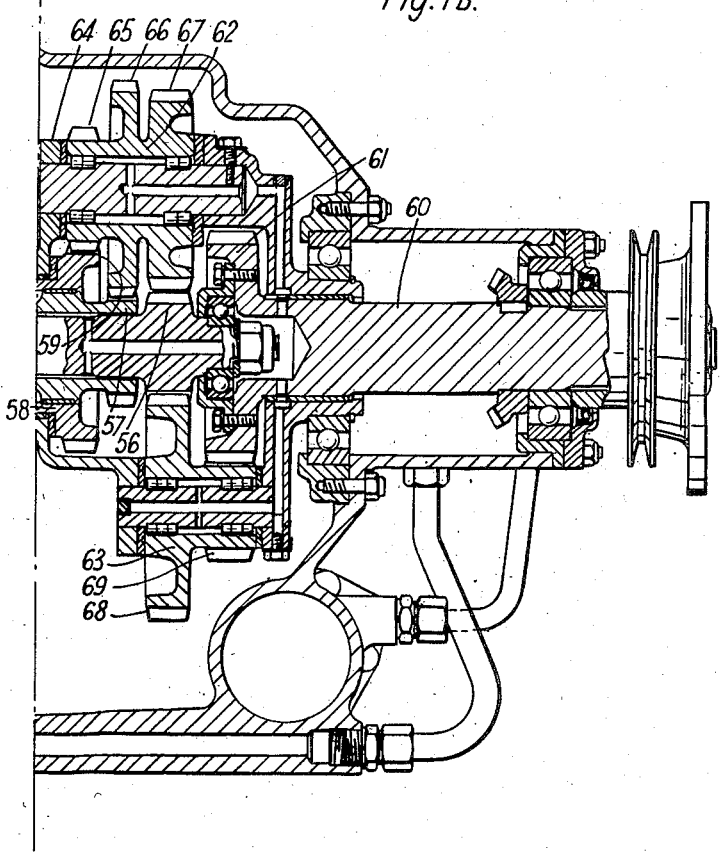
Figure 2:
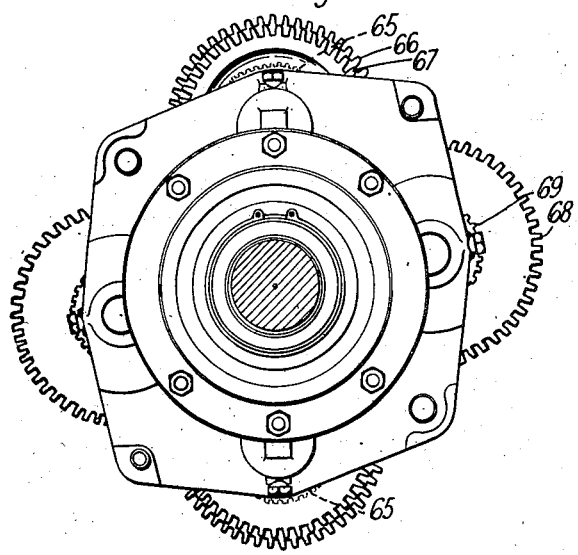
Figure 2 is an end view of the gear train of Figure 1.

Referring first to Figure 1, the clutch unit 10 is adapted to be bolted to the flywheel of an internal combustion engine, and encloses two hydraulically actuated friction clutches A and B. These clutches comprise spinner plates 11, 12, pressure plates 13, 14, friction plates 15, 16 (forming the front and back plate of the clutch unit), insulating plates 17, 18, flexible diaphragms 19 and 20, a centre plate 21, hereinafter referred to as the clutch valve body, carrying the diaphragms 19 and 20 which are of annular form and which are held at their inner diameters by clamp rings 22, 23, and at their outer diameters by clamp rings 24, 25. Each of the clutches is provided with a number of disengaging springs 26, 27. Liquid pressure to engage the clutches enters the actuating spaces 28, 29, by means of ducts, one of which is shown 30. Two piston valves 31 (one for each clutch) operate in a bore formed in the valve body, and serve the purpose of either opening the duct 30, to the duct 32, for engaging the clutch, or opening the duct 33 to an exhaust 34 for disengaging the clutch. A spring 35 acts to hold the piston valve outwards in the disengaging position.

The brake unit 36 encloses three hydraulically actuated plate brakes C, D and E. The construction of the brakes is somewhat similar to that of the clutches. Liquid pressure acting on flexible diaphragms 37, 38 and 39 cause engagement of plates 40, 41 and 42 through insulator plates 43, 44 and 45, and pressure plates 46, 47 and 48. In the case of the brakes, facings 49, 50 and 51, 52, etc., are attached to the pressure plates and to the plates such as 53, which form the unit, but in the case of the clutches, the friction facings are attached to the spinner plates.

The gear unit comprises an input shaft 54, an input sleeve 55, carrying sun gears 56 and 57, and a reaction sleeve 58, carrying sun gear 59. An output shaft 60 carries a toothed sun wheel 61. A cage 64 carries spindle elements 62 and other spindle elements 63, both said elements being offset from the axis of the sun wheels. The spindle elements 62 carry three sets of gear teeth or pinions 65, 66, 67 of different sizes. The spindle elements 63 each carry two sets of gear teeth or pinions 68, 69 of different sizes. The pinions 68 mesh with sun wheel 56 and pinions 69 mesh with the sun wheel 61. Pinions 65, 66 and 67 mesh respectively with sun wheels 59, 57, 56. Pinions 67, 68 mesh with each other.

The input shaft 54 carries a hub 110, to which the spinner plate 11 is attached and the clutch A when engaged can transmit the power through the shaft 54 to the gear 56. The sleeve 55 carries a hub 112 on the spinner plate 12, and if the B clutch is engaged, power can be transmitted through the sleeve 55 to the gear 57. The input sleeve 55 can also act as a reaction sleeve and carries a hub 140 attached to the spinner plate 40, and if brake C is engaged the sleeve 55 and gear 57 will be held stationary. The reaction sleeve 58 carries a hub 141 on the spinner plate 41, and if the brake B is engaged the sleeve 68 and the gear 59 will be held stationary. The cage 64 carries the hubs 142, 242 of the spinner plates 42, and if brake E is engaged, the cage 64 will be held stationary.

A hydraulic unit 70 comprises a pump 71, driven from the clutch unit, a feed journal 72, having a number of seal rings and two grooves 73, 74, by means of which hydraulic pressure can be led to either the A or B clutch or to both together. There are also a number of drillings, not shown, which connect the hydraulic unit to the different brakes. The unit has relief valves, a selector valve, and a valve which provides both manual and automatic selection of the different ratios. This is more fully described in our co-pending application No. 20,162 of 1952.

In operation, first ratio is obtained by engaging clutch A and brake E. The gear 56 will therefore be driven, and the cage 64 held stationary. Power is transmitted through the gears 56, 68, 69 and 61 to the output shaft.

Figure 3:
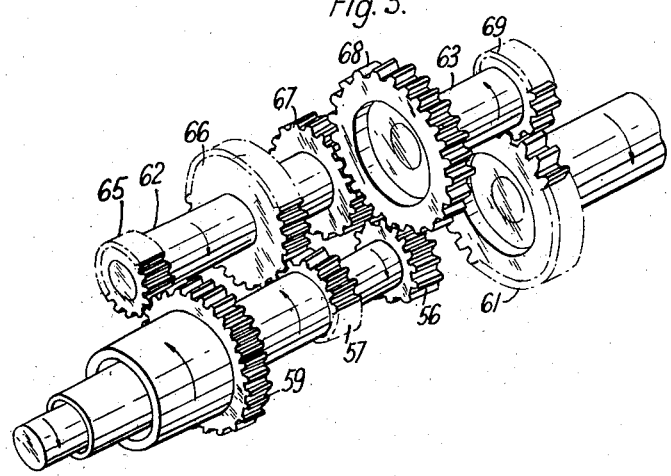
Figure 3 is a diagrammatic drawing showing the arrangement of the gearing of the transmission.

Second gear is obtained by disengaging brake E and engaging brake D. It will be understood with reference to Figure 3 that in this case, if the gear 56 is driven forwards in the direction shown by the arrow, and the gear 59 held stationary, the cage 64 (which carries the spindle elements 62, 63) will rotate slowly forwards since gear 68 will rotate slowly backwards, causing the gear 67 to rotate forwards and the sun gear 65 to rotate forwards in mesh with, or around the axis of the gear 59.

To obtain third gear, the brake D is disengaged and the brake C engaged. This holds the sun wheel 57 stationary and the gear 56 is driven and the cage will rotate at greater speed since the gear 66 is larger, and the gear 57 smaller.

To obtain direct drive, all brakes are disengaged and the clutch B engaged, since both clutches are engaged, and both gears 56, 57 driven, the cage 64 and the output shaft 60 will rotate at the same speed as the clutch unit. It will be observed that during direct drive condition, since the gear meshing with 57 tends to be driven in the opposite direction to the gear meshing with 56, the driving torque to both A and B clutch will act in the same direction, and the torque transmitted by the engine to which the transmission is attached, will be shared between the two clutches. This enables the clutch B to be made smaller, since it is never used for forward drive to transmit the full engine torque.

To obtain reverse, the B clutch is engaged and the A clutch disengaged, and the E brake engaged. The cage 64 will be held stationary, and the sun wheel 57 driven. Reverse ratio will therefore be transmitted through 57, 66, 67, 68, 69, 61, and drive being reversed due to the fact that the gear 68 meshes with the gear 67. In this case, the clutch B must transmit all the power, but it is particularly desirable to use a small "soft" clutch for reverse, so as to facilitate manoeuvrability. In other words, it is seldom necessary to carry full engine torque in reverse, and never with the engine rotating comparatively slowly.

It should also be noted that both first and reverse ratios employ the same brake. The reaction torque to be carried in first and reverse is much greater than during operation in other ratios, and it is desirable to provide the two plates shown. It therefore saves space and complication if the same brake can be used for first and reverse.

Figure 4:
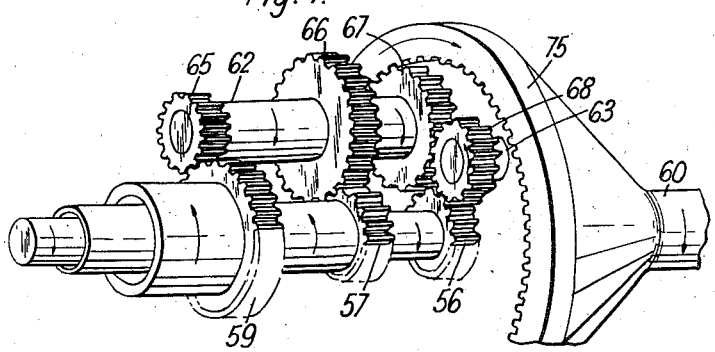
Figure 4 is a diagrammatic drawing showing a modified form of gearing.
Figure 5:
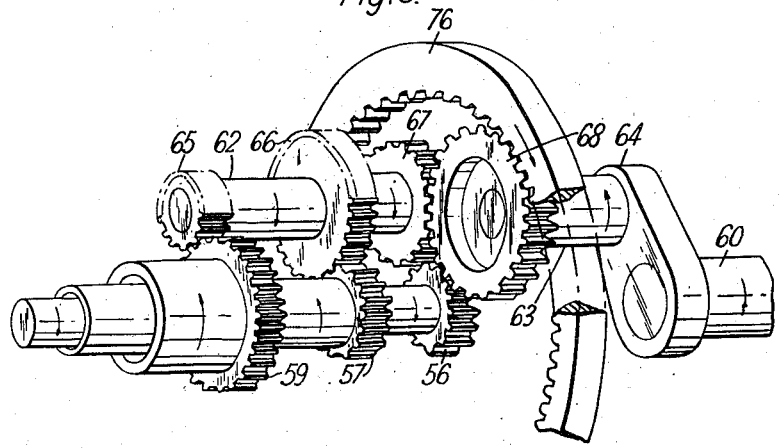
Figure 5 is a diagrammatic drawing showing a further modification.

In the alternative form of gearing shown in Figure 4, the output shaft carries a ring gear 75, instead of the sun wheel 61, and gear 69 not being required. The operation is as previously described, an advantage of the alternative arrangement being that greater loads can be carried by means of the ring gear 75, and increased choice in ratios provided can be obtained. Another simple modification is shown in Figure 5, in which case the ring gear 76 is used as a reaction element in place of the cage, the cage becoming the output element. This may also assist in carrying greater load and enables further choice in ratios to be obtained.

Various other modifications can be carried out either to increase the number of ratios obtainable, or to enable different ratios to be obtained. In every case, however, the action will be progressive, that is the speed of the cage 64 will either increase or decrease with change in ratio, but the increase or decrease in speed will be much less than that at which the input member is rotating, and in every case a number of planet pinions will inter-mesh so as to rotate the one set about their own spindles, in an opposite direction to that at which the other set is rotating. In every case, also, a number of ratios will be obtained by means of trains of gearing, all carried within the one common rotatable cage.

Reference to the following tables will show the ratios and speeds obtained from a typical apparatus made in accordance with the invention.

*Tooth numbers*

| Sun wheels: | Teeth |
|---|---|
| (59) | 34 |
| (57) | 18 |
| (56) | 16 |
| (61) | 30 |

Pinions, spindle element (62):

| | |
|---|---|
| (65) | 18 |
| (66) | 34 |
| (67) | 20 |

Pinions, spindle element (63):

| | |
|---|---|
| (68) | 31 |
| (69) | 17 |

Gear ratios

| | |
|---|---|
| Rev. | 5.16:1 |
| 1st | 3.42:1 |
| 2nd | 1.99:1 |
| 3rd | 1.39:1 |
| 4th | 1.0:1 |

Relative speeds

Cage (64)

| | |
|---|---|
| Rev. | Stationary. |
| 1st | Stationary. |
| 2nd | +.298 of input speed. |
| 3rd | +.602 of input speed. |
| 4th | +1.0 i. e. input speed. |

Spindle elements.—Relative speed, i. e. rotation on spindles

| | 62 | 63 |
|---|---|---|
| Rev | − .53 of input speed | + .341 of input speed. |
| 1st | + .80 of input speed | − .517 of input speed. |
| 2nd | + .562 of input speed | − .363 of input speed. |
| 3rd | + .218 of input speed | − .210 of input speed. |
| 4th | Relatively stationary | Relatively stationary. |

Sun wheels.—(Speeds in fraction of input speed)

| | (59) | (57) | (56) | (61) |
|---|---|---|---|---|
| Rev | +.28 | −1 | −.66 | −.193 |
| 1st | −.424 | −1.51 | Input Speed | +.293 |
| 2nd | 0. | −.765 | do | +.503 |
| 3rd | +.434 | 0 | do | +.718 |
| 4th | +1.0 | +1.0 | do | +1.0 |

It will be understood that during gear change—such as from 2nd to 3rd—one brake is released and the other one engaged, and the disengagement and engagement can be arranged to overlap so as to give the required uninterrupted transmission of power. With a transmission made in accordance with the invention, there is no tendency for reversal of drive to occur on the output shaft 60 for example during an up-change in ratio, since the gear 56 is always driven, tending to rotate the reaction members in a reverse direction, which during engagement of the brakes, tend to maintain the driving torque on the output shaft. If there is any gap or period of partial disengagement of the brakes during a change, the momentum of the cage resists the reaction torque that is tending to maintain the drive on the output shaft.

Having now described my invention, what I claim as new and desire to secure by Letters Patent is:

1. In a power transmission mechanism having an input driving member, at least three sun wheels mounted coaxially with each other and two sets of clutch means for driving two of said sun wheels independently by said input driving member, one set of said clutch means being smaller in size than the other set and used in reverse and/or direct drive, the provision of the following rotary elements viz. a planetary cage device, a first spindle element carried by said cage device and offset from the axis of said sun wheels, a first gear wheel fixed on said first spindle element in mesh with the first of said sun wheels, a second gear wheel fixed on said first spindle element, said second gear wheel being of different size from the first gear wheel, a second spindle element carried by said cage device, gearing carried by the second spindle element and meshing with the second gear wheel and with one of said independently driven sun wheels, an output shaft, means operatively connecting the output shaft with one of said spindle elements, three reaction brakes, means for connecting one of said reaction brakes and one of said clutch means to another one of said independently driven sun wheels, gearing means including the third of said sun wheels for connecting another of said reaction brakes to one of said elements, and means connecting the third reaction brake to another of said elements.

2. Power transmission mechanism as claimed in claim 1 wherein the means operatively connecting the output shaft with one of said spindle elements includes a ring gear geared to said first spindle element.

3. Power transmission mechanism as claimed in claim 1 wherein the means operatively connecting the output shaft with one of said spindle elements includes a connection between the output shaft and the cage device.

4. Power transmission mechanism as claimed in claim 1 having a ring gear with a reaction brake thereon and geared to said second spindle element.

5. Power transmission mechanism comprising two input clutches, first and second sun wheels coaxial with each other and connected to said clutches respectively, three reaction brakes, a third sun wheel coaxial with said two sun wheels and connected to one of said reaction brakes, a planetary cage, a first spindle element carried by said cage offset from the axis of said sun wheels, two sets of teeth on said spindle element meshing respectively with said second and third sun wheels, a third set of teeth on said first spindle element, a second spindle element carried by said cage and offset from the axis of said sun wheels and from the axis of said first spindle, a set of teeth of said second spindle element in mesh with said third set of teeth of the first spindle element, and in mesh with said first sun wheel, a second set of teeth on said second spindle element, an output shaft, a sun wheel on the output shaft coaxial with the other sun wheels and in mesh with the second set of teeth on said second spindle element, means connecting said cage to the second of said reaction brakes, and means connecting said second sun wheel to the third of said reaction brakes.

References Cited in the file of this patent

UNITED STATES PATENTS

| | | |
|---|---|---|
| 1,256,373 | Rowledge | Feb. 12, 1918 |
| 2,220,174 | Ravigneaux | Nov. 5, 1940 |
| 2,605,652 | Kelbel | Aug. 5, 1942 |
| 2,623,412 | Hobbs et al. | Dec. 30, 1952 |
| 2,761,333 | Ravigneaux | Sept. 4, 1956 |

FOREIGN PATENTS

| | | |
|---|---|---|
| 866,747 | Germany | Feb. 12, 1953 |